UNITED STATES PATENT OFFICE.

HENRY LOUIS BAGEAU, OF PARIS, FRANCE, ASSIGNOR OF TWO-THIRDS HIS RIGHT TO HENRY KLEIN AND HENRY SCHMITT, OF SAME PLACE.

IMPROVEMENT IN WATER-PROOF COMPOUNDS FOR SIZING AND COATING LEATHER, WOOD, &c.

Specification forming part of Letters Patent No. 151,822, dated June 9, 1874; application filed April 22, 1874.

*To all whom it may concern:*

Be it known that I, HENRY LOUIS BAGEAU, of Paris, France, have invented a certain new and Improved Compound for Water-Proofing, Sizing, and Cementing Wood, Cloth, and other Materials, of which the following is a specification:

My invention relates to a new and improved water-proofing compound or mastic and cement, which will be freed from any disagreeable odor or prejudicial vapors attendant upon the compositions of this class heretofore in use. The principal object of my invention is to produce a compound possessing the requisite water-proofing and cementing qualities without the use of bisulphide of carbon as a solvent, which has hitherto been necessary in all practical compounds for this purpose, and which is objectionable on account of its disagreeable odor and prejudicial qualities. My invention consists of a composition of caoutchouc, gutta-percha, resin, and white lead, and any proper essential or hydrocarbon solvent, which will dissolve the soluble ingredients of the same.

In carrying out my invention, I take five hundred (500) parts of caoutchouc, and dissolve the same until it forms a thick solution in any essential or hydrocarbon oil in which it is soluble, such as turpentine, benzine, &c.; two hundred and forty (240) parts of dry gutta-percha; one hundred (100) parts of resin, soft or brittle, according to the use for which the compound is intended; two hundred (200) parts of white lead, and four hundred (400) parts of essential or hydrocarbon oil or other solvent. I add more of the essential or hydrocarbon solvent if I wish to give more suppleness to the compound. These materials I mix and digest well in a hot state, and then allow the mass to cool. The mixture will then have a sirupy consistence, and may be rendered more fluid by the addition of the proper solvent.

When using the compound as a water-proofing material, I apply it to the article in a coat or layer, heating the articles, by preference, that the compound may better permeate the same. If necessary, I afterward apply a second coat in the same manner, and again leave it to dry.

When applying my compound as a cementing material, I apply it, as before, in layers to the parts to be united, and heat the same by a water-bath or slow fire, and then place them together, one upon another, and hammer or otherwise press them together until firmly united.

The proportions hereinbefore mentioned may be varied as occasion requires, so as to serve as a pliable water-proofing compound or as a cementing material; and therefore I do not limit myself precisely to the proportions of the ingredients as named; but

What I claim is—

The water-proofing compound or mastic and cement, as herein described, for sizing, coating, and cementing wood, leather, and other articles, said compound being composed of caoutchouc, gutta-percha, resin, white lead, and suitable solvent, as herein described, for the purposes set forth.

In testimony whereof I have signed my name to this specification before two subscribing witnesses.

H. L. BAGEAU.

Witnesses:
H. KLEIN,
ALBERT CAHEN.